United States Patent [19]

Welsh

[11] Patent Number: 4,760,777

[45] Date of Patent: Aug. 2, 1988

[54] TORTILLA STACKER

[75] Inventor: Richard S. Welsh, Sparks, Nev.

[73] Assignee: Famoso Equipment Company, Sparks, Nev.

[21] Appl. No.: 811,889

[22] Filed: Dec. 18, 1985

[51] Int. Cl.[4] ............................................. A21C 15/00
[52] U.S. Cl. .................................... 99/450.2; 99/450.1
[58] Field of Search ................. 99/450.1, 450.2, 450.3, 99/450.6, 450.7, 352, 353, 355, 349, 426, 427, 432, 483; 414/35, 69, 91, 92, 900, 903

[56] References Cited

FOREIGN PATENT DOCUMENTS 2308314 4/1975 France ............................... 99/450.1

Primary Examiner—Timothy F. Simone
Attorney, Agent, or Firm—Lyon & Lyon

[57] ABSTRACT

An apparatus for stacking tortillas includes a loading unit in the form of a trough-like loading conveyor for transporting a series of dough members while forming a small depression in each of the dough members. A container in the form of an upright hollow cylinder having a retractable loading surface is positioned at the discharge end of the loading conveyor. The tortillas are stacked one-on-top-of-the-other on the retractable loading surface by the loading conveyor. A conveyor located beneath the container receives the stack of tortillas upon retraction of the loading surface. A counter on an inclined chute leading to the conveyor accurately counts the number of tortillas entering the container.

19 Claims, 2 Drawing Sheets

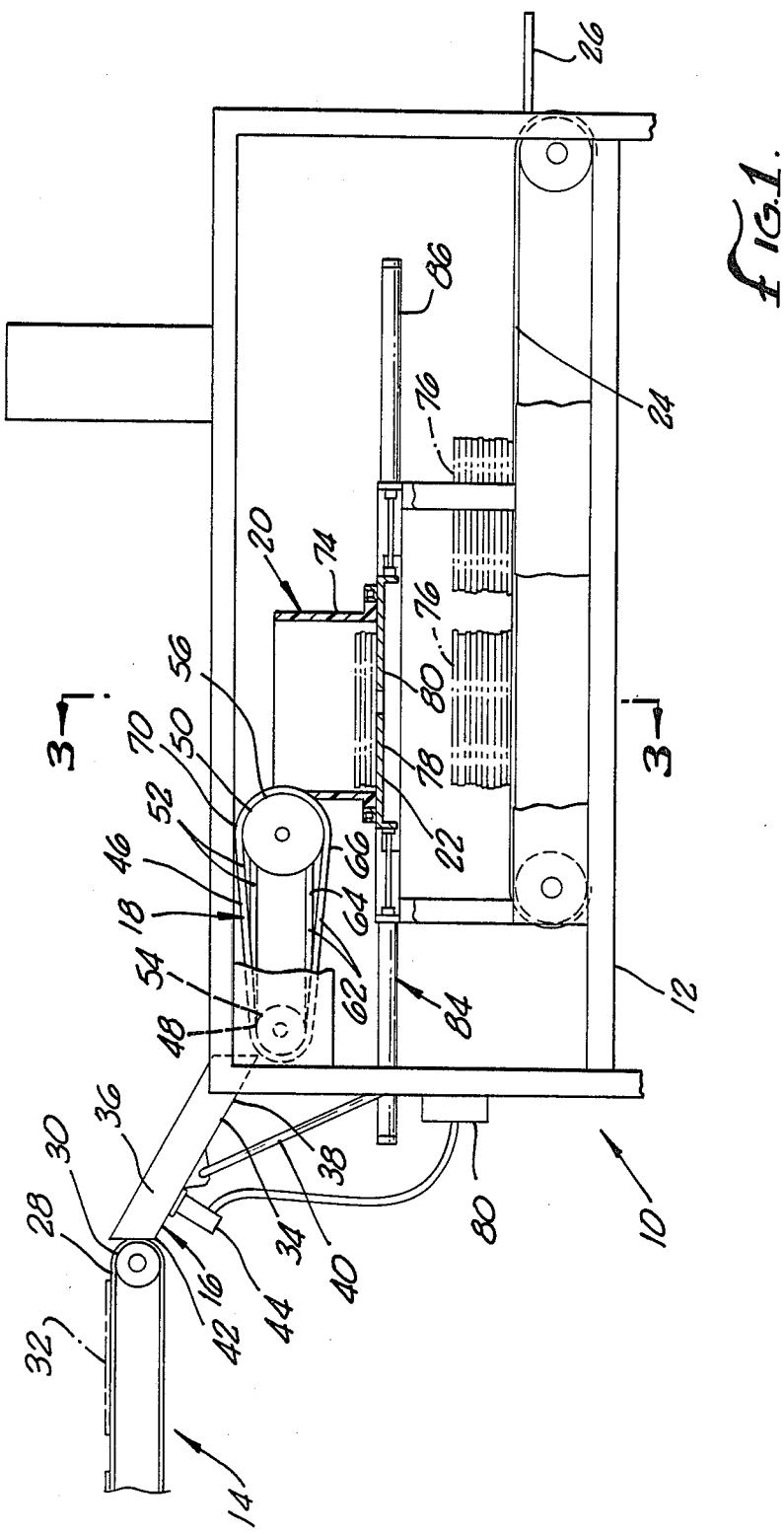

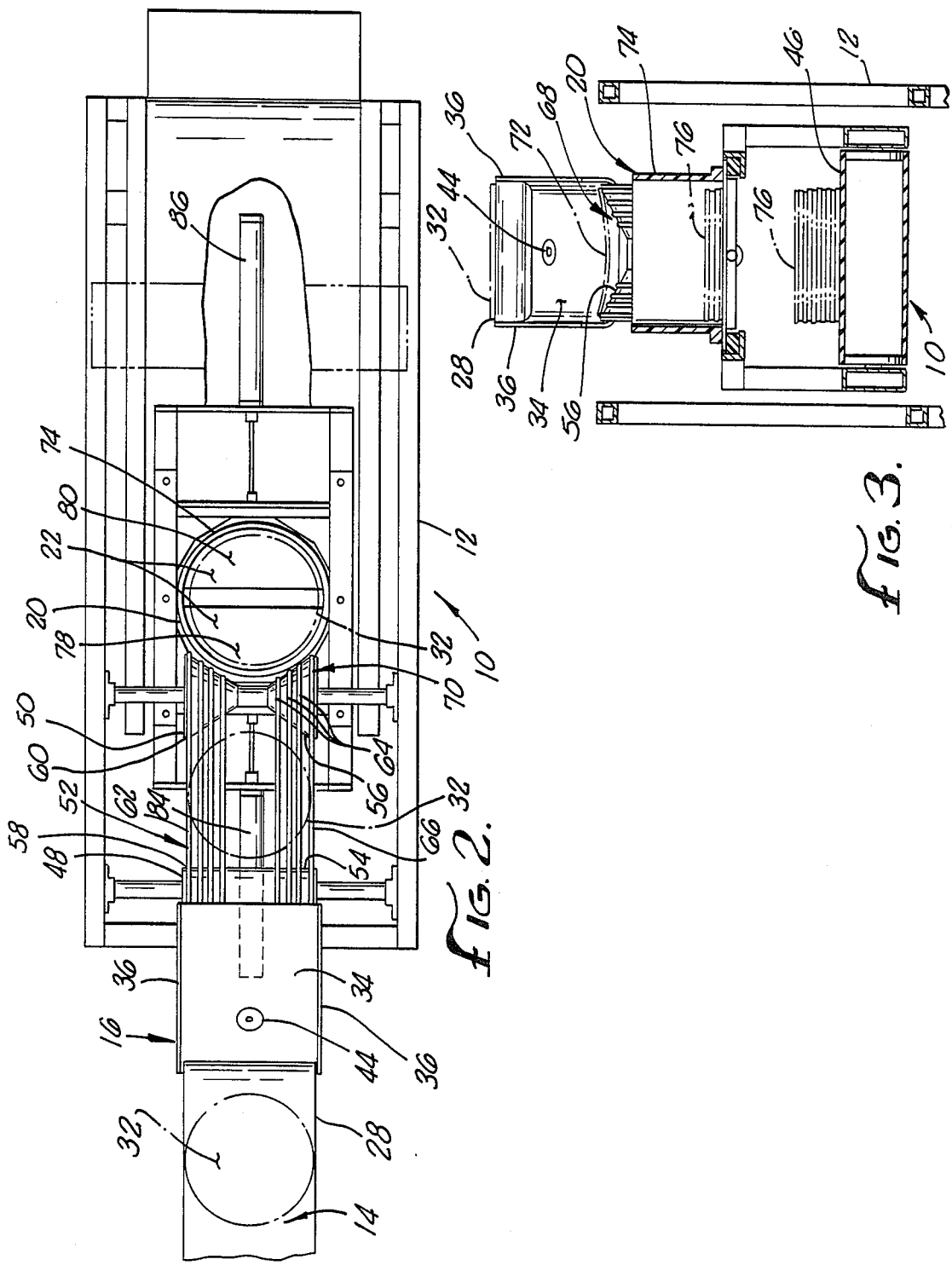

TORTILLA STACKER

BACKGROUND OF THE INVENTION

The field of the invention relates to apparatus and method for making tortillas and particularly concerns apparatus and method for stacking tortillas.

Generally, tortillas are individually processed through an oven on a conveyor belt. Once they are baked, an operator removes them from the conveyor belt and stacks them for packaging. The number of operators required to remove and stack tortillas depends on the conveyor belt speed. Even with a large number of operators the output of tortillas may be at a rate which makes it difficult for an operator to keep up with stacking and maintain neat stacks.

SUMMARY OF THE INVENTION

The present invention is directed to apparatus for stacking flat dough members such as for example tortillas. The apparatus includes a loading unit for creating a small depression in each of a series of flat dough members and a container having a retractable loading surface positioned after the loading unit in which each of the dough members are stacked one-on-top-of-the-other on the loading surface by the loading unit. The present invention eliminates the need for one or more operators and provides neat tortilla stacks.

BRIEF DESCRIPTION OF THE DRAWINGS

FIG. 1 is a side elevational view of the tortilla making apparatus of the invention.

FIG. 2 is a top elevational view of the tortilla making apparatus in FIG. 1.

FIG. 3 is a sectional view on section 3—3 of the tortilla making apparatus of FIG. 1.

DETAILED DESCRIPTION OF THE PREFERRED EMBODIMENT

The apparatus 10, illustrated in FIGS. 1, 2 and 3 includes a frame 12, a supply conveyor 14, a transfer chute 16, a stack loading unit 18, a stacking container 20 having a retractable stacking surface 22, a stack catching conveyor 24, and a stack catching tray 26.

The conveyor 14 has a flat belt 28 which is preferably made of a stainless steel mesh that forms a continuous moving loop around two end pulleys 30 (only the right end pulley is shown). A flat dough member or tortilla 32, as shown by the phantom lines, is supplied flat from an oven on this flat belt 28 onto the transfer chute 16.

The inclined transfer chute 16 has a flat bottom surface 34 and two sides 36. The transfer chute 16 is pivoted at the lower end 38 to the frame 12 for alignment with the stack loading unit 18 and has an adjustable support 40 for alignment of the upper end 42 with the supply conveyor 14.

A sensor unit 44 is positioned in the transfer chute 16 to sense when a tortilla 32 passes down the transfer chute 16 to the loading unit 18. The preferred sensor unit 44 is a capacitive proximity switch mounted in the center of the flat bottom surface 34 of the transfer chute 16.

The stack loading unit 18 which transfers the tortilla 32 into the stacking container 20 is preferably a stack loading conveyor 46 which includes a first or entering roller 48 and a second or discharge roller 50 adjacent the stacking container 20. The first and second rollers 48 and 50 are connected by a belting unit 52. The first roller 48 has a flat surface 54 and the second roller has a concave or beveled surface 56. The first roller 48 contains a series of parallel belting grooves 58 and the second roller 50 also contains a series of parallel belting grooves 60 aligned with the belting grooves 58. The belting unit 52 is formed of a series of individual belts 62, each of which provide a continuous loop around the first and second rollers 48 and 50.

As best shown in FIGS. 1 and 3, the diameter of the first and second rollers 48 and 50 at the inner belts 64 are about the same diameter. The diameter of the second roller 50 increases from the center of the belting unit 52 at about the inner belt 64 to the outside edges of the belting unit 52 at about the outer belts 66 to provide a trough-like belt shape 68 at the output end 70 of the stack loading conveyor 46. This trough-like belt shape 68 is shown in FIG. 3 with a tortilla 32 shown positioned thereon. The trough-like belt shape 68 forms a slight depression 72 in the middle of the tortilla 32. This slight depression 72 provides a tortilla shape which continues to be substantially flat but which has more structural stability than a flat tortilla shape. This permits the tortilla 32 to be projected off the end of the stack loading unit 18 in a straight line down into the stacking container 20 without curling under or folding, etc. In other words, by slightly folding the tortilla on the stack loading conveyor 46 of the stack loading unit 18 to provide the slight depression 72, it has shape which permits the tortilla to be consistently and accurately discharged into the stacking container 20 to form a neat stack.

The tortilla 32 only sags a small amount, perhaps about ¼", to form the slight depression 72 but does not fully conform to the trough-like belt shape 68, partly because it moves very fast over the length of the stack loading conveyor 46 to drop into the stacking container 20. The tortilla 32 is generally round and thin. The stacking container 20 is an upright hollow cylindrical member 74 formed of delrin and has an inside diameter which establishes the maximum diameter of the tortilla stack 76 shown in phantom in FIGS. 1, 2 and 3.

The moveable stacking surface 22 of the stacking container 20 includes a first or left slide 78 and a second or right slide 80. The first and second slides 78 and 80 are operated with a slide moving unit that includes first and second air cylinders 84 and 86. The first and second air cylinders 84 and 86 rapidly retract to pull the first and second slides 78 and 80 away from each other to open the bottom of the stacking container 20 so that a tortilla stack 76 is dropped down and out of the stacking container 20 onto the stack catching conveyor 24. The first and second air cylinders 84 and 86 extend to close the first and second slides 78 and 80 against each other as shown to reform the stacking surface 22 for forming a subsequent tortilla stack 76. The first and second slides 78 and 80 are preferably made of teflon-coated stainless steel to prevent sticking of the tortillas, to provide ease of cleaning and to permit relatively frictionless operation.

The tortilla stack 76 in the stacking container 20 can contain anywhere from one tortilla to forty tortillas as desired and selected by the operator. Each tortilla 32 passing into the stacking container 20 is indicated by the sensor unit 44 to a count select logic module 82 which operates the first and second air cylinder 84 and 86 to open and close the first and second slides 78 and 80 which form the moveable stacking surface 22.

The stack catching conveyor 24 operates at a very slow speed to move the tortilla stack 76 away from under the stacking container 20. The stack catching conveyor 24 may also be moved intermittently or indexed to space a tortilla stack from a prior tortilla stack. Once each of the tortilla stacks 74 is moved to the end of the stack catching conveyor 24, it slides off or is pushed off the stack catching conveyor 24 onto a stack catching tray 26 for subsequent processing and/or packaging.

In the operation of the apparatus 10 a continuous series of tortillas 32 are provided to the supply conveyor 14. The supply conveyor 14 supplies this continuous series of tortillas 32 one-after-the-other down a transfer chute 16. The tortillas 32 feed from the transfer chute 16 onto the stack loading conveyor 46.

The continuous series of tortillas 32 are positioned one-after-the-other in the trough-like belt shape 68 of the stack loading conveyor 46. The trough-like belt shape 68 transports the tortillas 32 while forming a slight depression 72 in each tortilla 32.

Each of the tortillas 32 are then moved off the discharge roller 50 of the stack loading conveyor 46 to drop one-on-top-of-the-other in a stack 76 on the retractable stacking surface 22 of the stacking container 20.

The sensor unit 44 senses the number of tortillas 32 dropped onto the retractable stacking surface 22 and when the desired number of tortillas have been counted by the module 82 the first and second slides 78 and 80 are retracted away from each other to open the bottom of the hollow cylindrical member 74. As soon as the bottom of the hollow cylindrical member 74 is open the tortilla stack 76 is unloaded onto the stack catching conveyor 24. The first and second slides 78 and 80 then return to the closed position to form the stacking surface 22 for the next tortilla stack.

The stack catching conveyor 74 is moved to hold a spaced series of tortilla stacks 76, each tortilla stack 76 having a predetermined number of tortillas 32. Each tortilla stack 76 slides or is pushed off the stack catching conveyor 24 onto a stack catching tray 26.

While an embodiment of the tortilla stacker has been shown and described, it will be apparent to those skilled in the art that modifications are possible without departing from the described inventive concepts. Therefore, the invention is not to be restricted except in the spirit of the following claims.

I claim:

1. Apparatus for stacking dough members comprising a loading unit having a discharge means for forming a lateral depression in each of a series of the dough members without folding the dough members and for projecting the dough members substantially horizontally in a direction perpendicular to said lateral depression, and
a container having a bottom loading surface, said container positioned at said discharge means of said loading unit into which each of said dough members are projected and stacked one-on-top-of-the-other on said loading surface by said loading unit.

2. The apparatus of claim 1 wherein said loading unit is a loading conveyor having at least one conveyor roller and conveyor belting configured to form said small depression.

3. The apparatus of claim 1 for dough members that are generally round wherein said container is an upright hollow cylindrical member having an inside diameter providing the maximum diameter of said stack of said dough members.

4. The apparatus of claim 1 further comprising an inclined transfer chute for supply of said dough members to said loading unit.

5. The apparatus of claim 1 wherein said loading surface includes retractable slide member for discharging a stack of dough members from said container.

6. The apparatus of claim 1 further comprising a sensor unit for determining the number of said dough members in said stack, and
a stack unloading unit for removing a stack having a predetermined number of said dough members from said container.

7. The apparataus of claim 6 further comprising a stack catching conveyor for holding a spaced series of said stacks of dough members removed from said container by said stack unloading unit.

8. The apparatus of claim 6 wherein said stack unloading unit includes at least one slide member forming said bottom loading surface in said container, and
a slide moving unit for retracting said slide member from said container to unload said stack of said dough members onto said stack catching conveyor.

9. Apparatus for stacking dough members comprising a loading conveyor having a discharge for forming a depression in each of a series of dough members, said conveyor having a first entering conveyor roller and a second discharge conveyor roller connected by a continuous loop belting unit, at least said discharge roller having a beveled surface, said belting unit forming a trough-like conveyor belting configured to create said depression during transporting dough members, and
a container having a bottom loading surface, said container positioned at said discharge of said loading unit in which each of said dough members are stacked one-on-top-of-the-other on said loading surface by said loading unit.

10. The apparatus of claim 9 wherein said first roller and said second roller each have a series of parallel grooves and said belting unit includes an individual belt in each of said grooves, all of said individual belts forming said trough-like conveyor belting.

11. The apparatus of claim 9 for dough members that are generally round wherein said container is an upright hollow cylindrical member having an inside diameter providing the maximum diameter of said stack of said dough members.

12. The apparatus of claim 9 further comprising an inclined transfer chute for supply of said dough members to said loading unit.

13. The apparatus of claim 9 wherein said loading surface includes retractable slide member for discharging a stack of dough members from said container.

14. The apparatus of claim 9 further comprising a sensor unit for determining the number of said dough members in said stack, and
a stack unloading unit for removing a stack having a predetermined number of said dough members from said container.

15. The apparatus of claim 14 further comprising a stack catching conveyor for holding a spaced series of said stacks of dough members removed from said container by said stack unloading unit.

16. The apparatus of claim 14 wherein said stack unloading unit includes at least one slide member forming said bottom loading surface in said container, and a slide moving unit for retracting said slide member from said container to unload said stack of said dough members onto said stack catching conveyor.

17. Apparatus for stacking tortillas comprising a trough-like conveyor for transporting a continuous series of tortillas while forming a lateral depression therein, said depression maintaining said tortillas in a substantially flat shape without folding for flat stacking, said conveyor having a discharge end for projecting said tortillas in a substantially horizontal direction into the air and unsupported, an upright hollow cylinder positioned at the discharge end of said conveyor into which each of said tortillas is projected and stacked one-on-top-of-the-other by said conveyor, and means for periodically unloading the stacked tortillas from said cylinder.

18. The apparatus of claim 17 wherein said means include a retractable stacking surface forming a bottom for said cylinder.

19. Apparatus for stacking tortillas comprising a trough-like conveyor for transporting a continuous series of tortillas while forming a depression therein, said depression maintaining said tortillas in a substantially flat shape for flat stacking, said conveyor including spaced first and second conveyor rollers, a continuous belting around said first and second conveyor rollers, said belting and at least one of said rollers forming a trough-like surface for transporting said tortillas, such belting formed of a plurality of round belts, an upright hollow cylinder positioned at the discharge end of said conveyor in which each said tortillas is stacked one-on-top-of-the-other by said conveyor, and means for periodically unloading the stacked tortillas from said cylinder.

* * * * *